United States Patent
Sato et al.

(10) Patent No.: US 9,037,629 B2
(45) Date of Patent: May 19, 2015

(54) REMOTE ACCESS SYSTEM, ELECTRONIC APPARATUS AND METHOD OF PROCESSING REMOTE ACCESS

(75) Inventors: Jun Sato, Kokubunji (JP); Keiko Watanabe, Fuchu (JP); Junichi Iwasaki, Fussa (JP); Takashi Minemura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 467 days.

(21) Appl. No.: 13/440,873

(22) Filed: Apr. 5, 2012

(65) Prior Publication Data

US 2013/0060830 A1    Mar. 7, 2013

(30) Foreign Application Priority Data

Sep. 7, 2011  (JP) ................... 2011-195020

(51) Int. Cl.
- *G06F 15/16*  (2006.01)
- *H04L 29/08*  (2006.01)
- *G06F 15/173*  (2006.01)

(52) U.S. Cl.
CPC ............ *H04L 67/025* (2013.01); *H04L 67/125* (2013.01)

(58) Field of Classification Search
CPC ........................... H04L 67/125; H04L 67/025
USPC ......................................... 709/201, 224, 228
See application file for complete search history.

(56) References Cited

U.S. PATENT DOCUMENTS

| | | | |
|---|---|---|---|
| 7,571,269 B2 | 8/2009 | Schmidt et al. | |
| 2003/0018828 A1 | 1/2003 | Craddock et al. | |
| 2007/0025539 A1 | 2/2007 | Claudatos et al. | |
| 2009/0164709 A1* | 6/2009 | Lee et al. ...................... | 711/103 |

FOREIGN PATENT DOCUMENTS

| | | |
|---|---|---|
| JP | H01213736 A | 8/1989 |
| JP | H07160446 A | 6/1995 |
| JP | H08016504 A | 1/1996 |
| JP | H11085406 A | 3/1999 |
| JP | 2004020976 A | 1/2004 |
| JP | 2004-531001 | 10/2004 |
| JP | 2005216116 A | 8/2005 |
| JP | 2007207089 A | 8/2007 |
| JP | 2008193217 A | 8/2008 |

(Continued)

OTHER PUBLICATIONS

Japanese Office Action for JP Application No. 2011-195020, dated Jun. 19, 2012.

(Continued)

*Primary Examiner* — Hee Soo Kim
(74) *Attorney, Agent, or Firm* — Patterson & Sheridan, LLP

(57) ABSTRACT

According to one embodiment, an electronic apparatus includes a first module and a second module. The first module receives a remote command from another electronic apparatus and transmits a response to the remote command to the other electronic apparatus. The remote command includes command type information indicating a type of the local command. The second module issues one or more local commands including the local command to the storage device and transmits a first response from the storage device to the other electronic apparatus by storing the first response into a second response to the remote command, in accordance with a process specified by the command type information in the remote command.

34 Claims, 11 Drawing Sheets

(56) References Cited

FOREIGN PATENT DOCUMENTS

| | | |
|---|---|---|
| JP | 2008-545344 | 12/2008 |
| JP | 2008310532 A | 12/2008 |
| JP | 2009-508192 | 2/2009 |
| JP | 2009512919 A | 3/2009 |
| JP | 2009176306 A | 8/2009 |
| JP | 2010108341 A | 5/2010 |
| JP | 2010257094 A | 11/2010 |

OTHER PUBLICATIONS

Japanese Office Action for JP Application No. 2011-195020, dated Nov. 20, 2012.

Japanese Office Action for JP Application No. 2011-195020, dated Sep. 18, 2012.

* cited by examiner

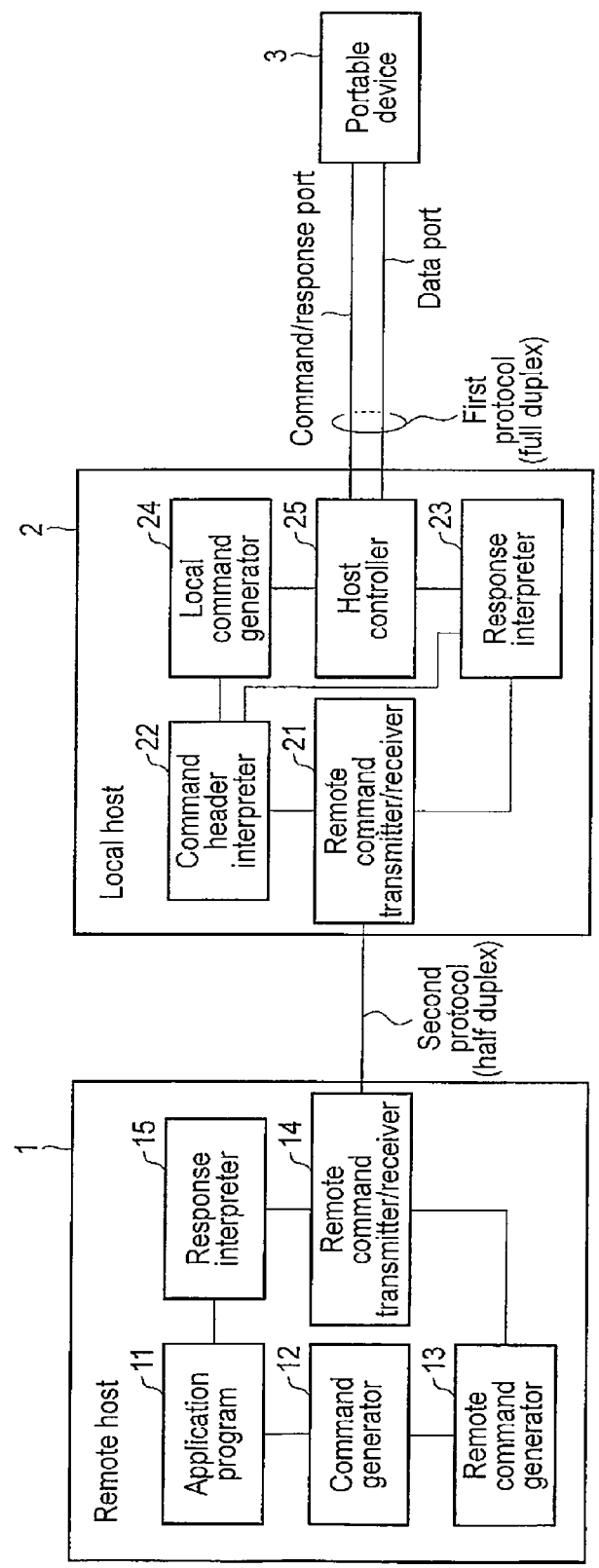
F I G. 1

| Command Types | |
|---|---|
| br | Broadcast commands, no response |
| bcr | Broad commands with response |
| ac | Addressed (point-to-point) commands |
| adtc | Addressed (point-to-point) data transfer commands |

FIG. 2

| Command Response Types | | bits |
|---|---|---|
| R1 | Normal Response Command | 48 |
| R1b | Normal Response Command with busy | 48 |
| R2 | CID, CSD register | 136 |
| R3 | OCR register | 48 |
| R4 | IO_SEND_OP_COND response | 48 |
| R5 | IO_RW_DIRECT response | 48 |
| R6 | Published RCA response | 48 |
| R7 | Card interface condition | 48 |

FIG. 3

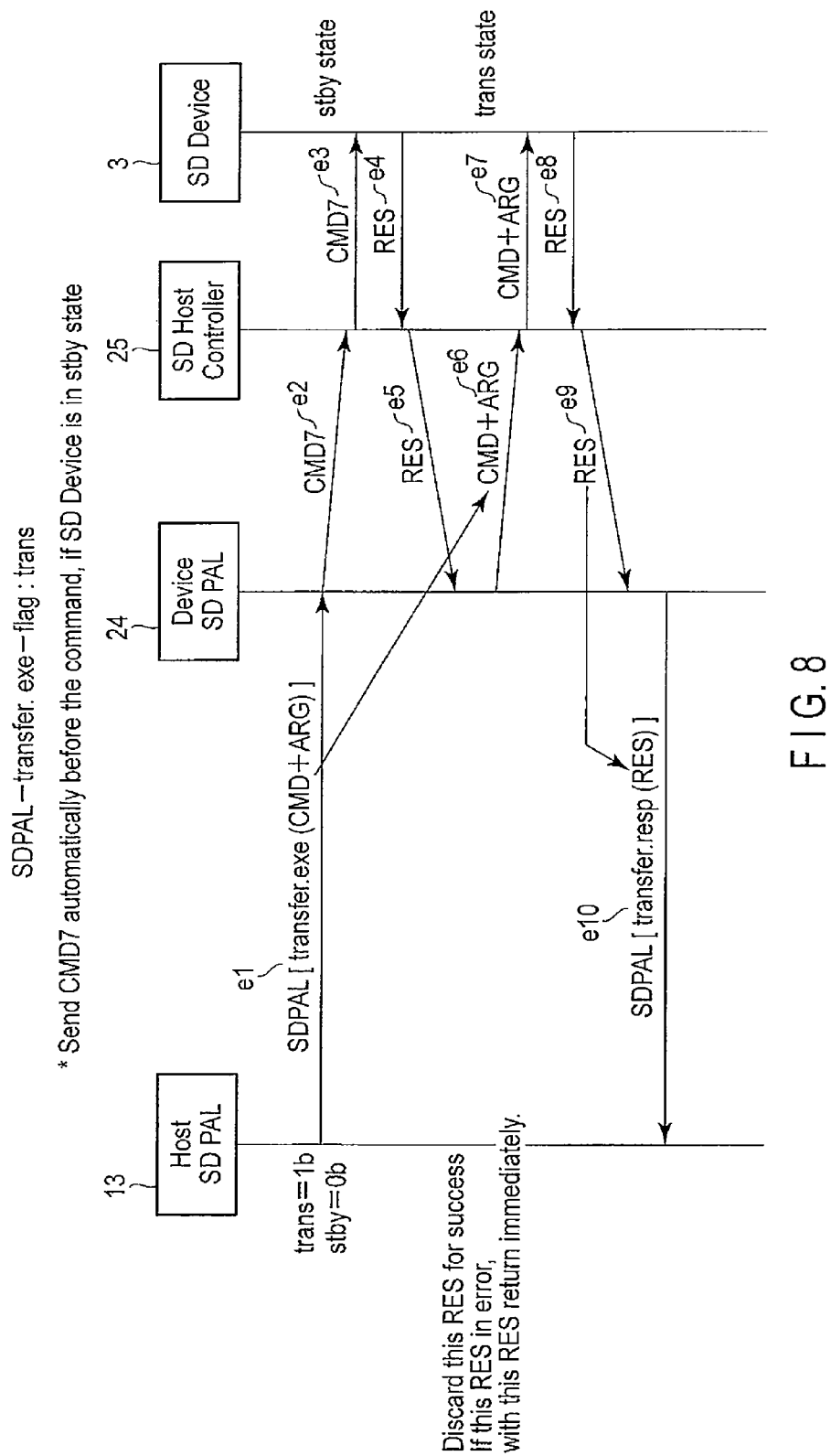
F I G. 8

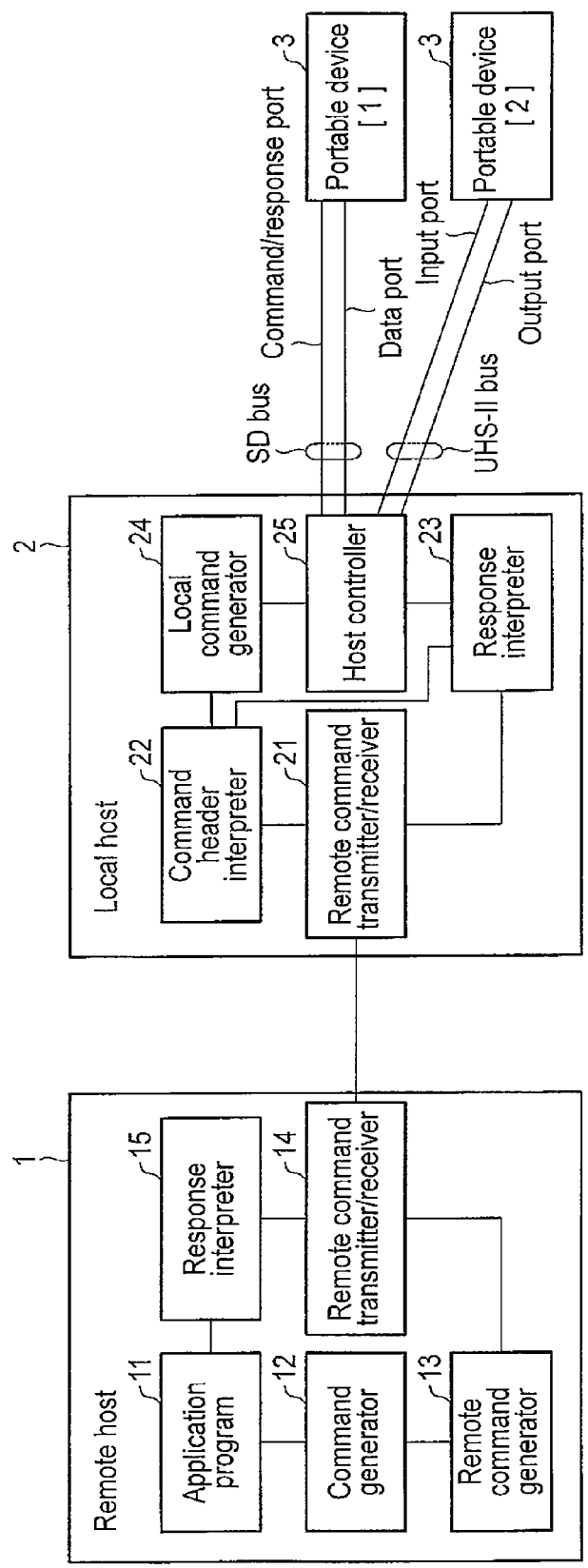
F I G. 12

REMOTE ACCESS SYSTEM, ELECTRONIC APPARATUS AND METHOD OF PROCESSING REMOTE ACCESS

CROSS-REFERENCE TO RELATED APPLICATIONS

This application is based upon and claims the benefit of priority from prior Japanese Patent Application No. 2011-195020, filed Sep. 7, 2011, the entire contents of which are incorporated herein by reference.

FIELD

Embodiments described herein relate generally to a remote access technique, in which a storage device which is controlled by a first electronic apparatus is operated by remote control from a second electronic apparatus through the first electronic apparatus.

BACKGROUND

In recent years, with advance in data communication technique and equipment of network environment, data exchange between a plurality of electronic apparatuses has been performed in various forms. Therefore, various mechanisms relating to data exchange between a plurality of electronic apparatuses have been proposed in the prior art.

Recently, as in offices, wireless LANs (Local Area Networks) are also being constructed in homes, and they are used to connect household electrical appliances such as televisions, HDD (Hard Disk Drive)/DVD (Digital Versatile Disc) recorders, personal computers (PC), and printers by wireless communication without cables.

For example, some HDD/DVD recorders and printers include a slot to store a portable medium such as an SD card (Registered Trademark) or the like. Therefore, there are increasing demands for remote control of portable media which are stored in HDD/DVD recorders and printers by wireless communication from a personal computer or the like.

Generally, communication between a plurality of household electrical appliances adopts a half duplex system or a communication system based on the same, regardless of wired or wireless communication. On the other hand, many portable media include a full-duplex interface. When a portable medium (which includes a full-duplex interface) stored in a household electrical appliance is operated by remote control from another household electrical appliance (which performs half-duplex communication), it is necessary to match the half-duplex communication part of the former with the full-duplex communication part of the latter.

However, communication between a plurality of household electrical appliances, that is, processing of the half-duplex communication part of the former is preferably minor processing which does not require the user to be conscious of matching the former with the full-duplex communication part of the latter.

In addition, some portable media can additionally have new functions. Therefore, even if commands which are processed in the full-duplex communication part of the latter are increased with the addition of new functions, it is preferable that the system can be operated without changing the processing of the half-duplex communication part of the former.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram of a schematic configuration of a remote access system according to a first embodiment.

FIG. 2 is an exemplary diagram illustrating command types of a first protocol applied to the remote access system of the first embodiment.

FIG. 3 is an exemplary diagram illustrating response types of the first protocol applied to the remote access system of the first embodiment.

FIG. 8 is an exemplary diagram illustrating a command execution sequence performed when a trans flag is turned on in the remote access system of the second embodiment.

FIG. 12 is an exemplary block diagram of a schematic configuration of a remote access system of a third embodiment.

DETAILED DESCRIPTION

Figure 4:
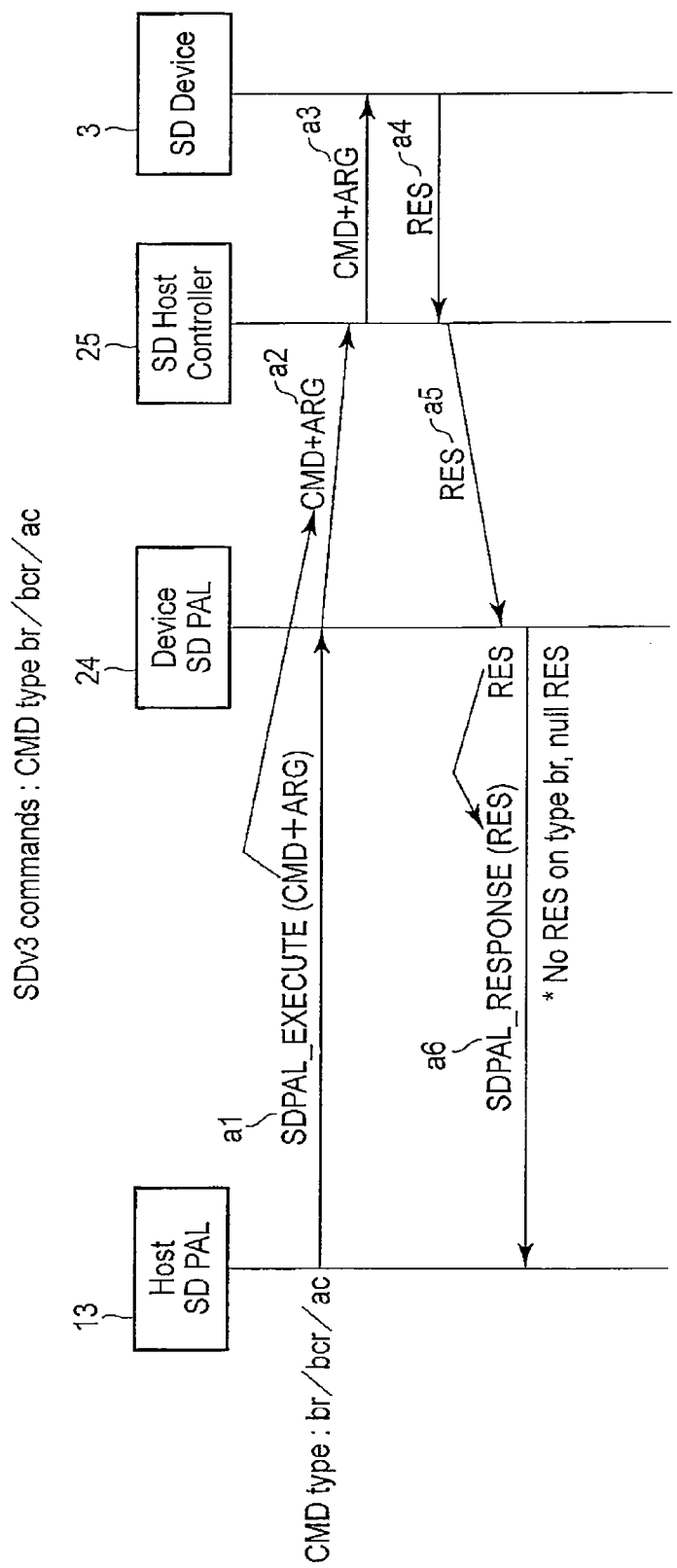
FIG. 4 is an exemplary diagram illustrating a no-data command execution sequence in the remote access system of the first embodiment.

Various embodiments will be described hereinafter with reference to the accompanying drawings.

In general, according to one embodiment, an electronic apparatus includes a remote command transmitting/receiving module and a command processing module. The remote command transmitting/receiving module is configured to receive a remote command of a second protocol from another electronic apparatus and to transmit a response to the remote command to the other electronic apparatus. The remote command is issued for transmitting a local command of a first protocol to be issued to a storage device. The remote command includes command type information indicating a type of the local command. The command processing module is configured to issue one or more local commands comprising the local command transmitted from the other electronic apparatus by the remote command to the storage device, and to transmit a first response from the storage device to the other electronic apparatus by storing the first response into a second response to the remote command, which is to be transmitted by the remote command transmitting/receiving module, in accordance with a process specified by the command type information in the remote command received by the remote command transmitting/receiving module from the other electronic apparatus.

First Embodiment

First, a first embodiment will be explained hereinafter.

FIG. 1 is an exemplary block diagram of a schematic configuration of a remote access system according to the first embodiment. As illustrated in FIG. 1, the remote access system of the present embodiment broadly includes a remote host 1, a local host 2 and a portable device 3. The remote host 1 is, for example, a personal computer. The local host 2 is, for example, an HDD/DVD recorder. The portable device 3 is, for example, an SD card (Registered Trademark), and detachably stored in a slot which is provided in the local host 2.

The local host 2 directly controls the portable device 3 through a host controller 25. The portable device 3 which is stored in, for example, the slot provided in the local host 2 is connected with the host controller 25 through physical transmission paths of a command/response port and a data port. Therefore, a first protocol (full duplex) which includes commands, responses, and a data transmission/reception system that are designed based on the data line structure in which the command/response port and the data port differ is applied to communication between the host controller 25 and the portable device 3.

In addition, although not shown, power supply and clocks are supplied from the local host 2 to the portable device 3 by using another transmission path. When the portable device 3 is connected to the local host 2, the portable device 3 is automatically initialized by the local host 2, and the portable device 3 changes to a standby (stby) state.

The remote host 1 and the local host 2 are connected to each other by wired or wireless communication means. Each of the remote host 1 and the local host 2 includes a remote command transmission/reception module (14, 21), as an interface for connection by the wired or wireless communication means. A second protocol (half duplex) includes commands, responses, and a data transmission/reception system that are designed based on the data line structure in which the input port and the output port differ.

Therefore, communications which are performed when the portable device 3 is operated by remote control from the remote host 1 through the local host 2 include both a half-duplex communication part, to which the second protocol is applied, and a full-duplex communication part, to which the first protocol is applied. Therefore, the remote access system of the present embodiment realizes a remote access function of operating the portable device 3 by remote control from the remote host 1 through the local host 2, as a mechanism with excellent convenience and expansion. This point will be explained in detail hereinafter.

The first protocol (which includes commands, responses, and data transmission/reception system that are designed based on the data line structure in which the command/response port and the data port differ) described above includes four commands types, that is, br, bcr, ac, and adtc, as illustrated in FIG. 2. The type "br" is defined as "Broadcast commands, no response", the type "bcr" is defined as "Broad commands with response", the type "ac" is defined as "Addressed (point-to-point) commands", and the type "adtc" is defined as "Addressed (point-to-point) data transfer commands".

In addition, the first protocol includes eight response types of r1, r1b, r2, r3, r4, r5, r6, and r7, as illustrated in FIG. 3. The type "r1" is defined as "Normal Response Command", the type "r1b" is defined as "Normal Response command with busy", the type "r2" is defined as "CID, CSD register", the type "r3" is defined as "OCR register", the type "r4" is defined as "IO_SEND_OP_COND response", the type "r5" is defined as "IO_RW_DIRECT response", the type "r6" is defined as "Published RCA response", and the type "r7" is defined as "Card interface condition". A data format and a data size are defined for each response type.

In the remote access system of the present embodiment, accesses to the portable device 3 from a remote environment are classified into the following three systems.

(1) No-data command execution
(2) Data-out command execution
(3) Data-in command execution The above system (1) corresponds to the command types of br, bcr, and ac. The above system (2) corresponds to the cases where the host device writes data in the command type of adtc. The above system (3) corresponds to the cases where the host device reads out data in the command type of adtc.

When the remote host 1 operates the portable device 3 by remote control through the local host 2, the remote host 1 transmits a command of the first protocol (local command), which is issued for the portable device 3, to the local host 2 as a command (remote command) of the second protocol. The local command is formed of a command number and an argument. When the remote host 1 transmits the command, the remote host 1 also transmits a command type of the local command as header information of the remote command.

On the other hand, the local host 2 determines to which of the three systems (1) to (3) the transmitted local command belongs, and issues one or more local commands which include the transmitted local command to the portable device 3, in accordance with a process that corresponds to the determined system.

In addition to the command type, the remote host 1 also transmits a response type, which indicates the type of a response which is expected to be received for the local command from the portable device 3, as header information of the remote command to the local host 2. As described above, since a data size is defined for each of the response types, the local host 2 secures a storage region to store the response from the portable device 3, based on the transmitted response type. In addition, the local host 2 can recognize the timing of the response, based on the response type.

With reference to FIG. 1 again, the basic operation of each module of the remote host 1 and the local host 2 in the remote access system of the present embodiment will be explained hereinafter.

When an application program 11 which operates on the remote host 1 performs control of the portable device 3, a command generator 12 generates a command to control the portable device 3. When the portable device 3 to be controlled exists in a remote environment, the command generated by the command generator 12 is converted into a remote command by a remote command generator 13, according to the generated command. In the conversion, the command type and the response type are assigned to the remote command as header information. The remote command obtained by conversion is transmitted to the local host 2 by a remote command transmitter/receiver 14.

The local host 2 receives the remote command from the remote host 1 by a remote command transmitter/receiver 21, and transfers the remote command to a command header interpreter 22. The command header interpreter 22 interprets the header of the remote command received by the remote command transmitter/receiver 21. The command header interpreter 22 transmits a command type, which is interpreted from the remote command header, and the remote command to a local command generator 24, and transmits a response type which is interpreted from the remote command header to a response interpreter 23.

The local command generator 24 generates a group of commands to control the portable device 3, from the command type and the remote command received from the command header interpreter 22. The local command generator 24 issues the generated commands to the portable device 3 through a host controller 25, in accordance with a process that corresponds to one of the above systems (1) to (3), which is identified based on the command type received from the command header interpreter 22.

A result of execution in the portable device 3 is returned to the host controller 25, and checked in the response interpreter 23. When the result has an expected response data format corresponding to the response type received from the command header interpreter 22, the response interpreter 23 transmits the result to the remote command transmitter/receiver 21. Thereby, the result is transmitted to the remote host 1. In the remote host 1, the response is interpreted by a response interpreter 15, and lastly the application program 11 is notified of an execution result.

As described above, the modules of the remote host 1 and the local host 2 in the remote access system of the present embodiment perform the above basic operation.

Next, a command execution sequence of each of the above systems (1) to (3) will be explained hereinafter.

FIG. 4 is an exemplary diagram illustrating a no-data command execution sequence.

In the case of no-data command types (br, bcr, ac), the remote host 1 transmits a command type, a command number, an argument, and a response type to the local host 2 (a1 of FIG. 4). On the other hand, when the received command type is a no-data command type (br, bcr, ac), the local host 2 transmits the received command number and the argument to the portable device 3 (a2 and a3 of FIG. 4). Then, the local host 2 transmits a response which is returned from the portable device 3 to the remote host 1 (a4 to a6 of FIG. 4). In the case of a command with no response, the local host 2 transmits a response with empty response data to the remote host 1.

Figure 5:
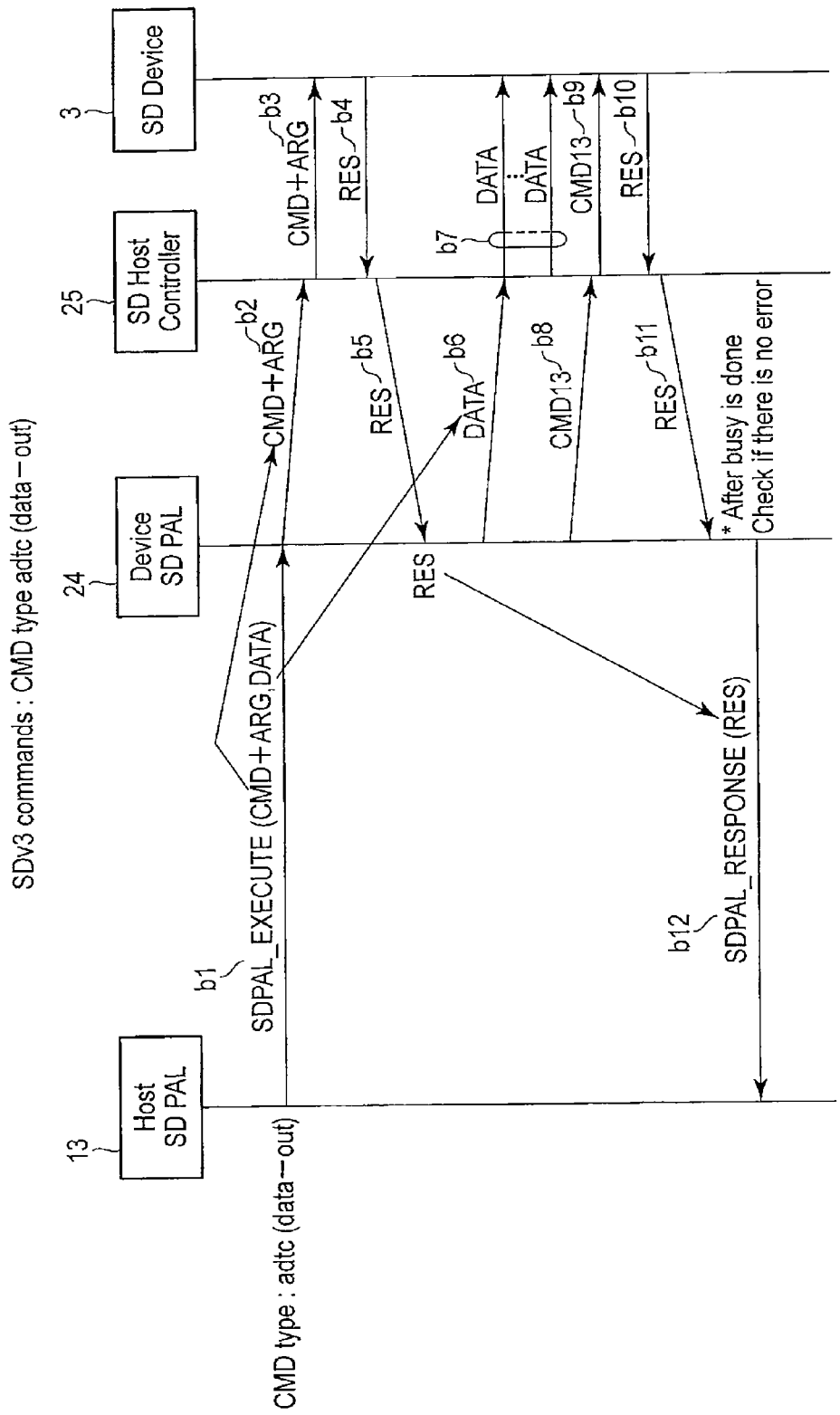
FIG. 5 is an exemplary diagram illustrating a data-out command execution sequence in the remote access system of the first embodiment.

FIG. 5 is an exemplary diagram illustrating a data-out command execution sequence.

In the case of a data-out command type (adtc), the remote host 1 transmits a command type, a command number, an argument, a response type, and data to the local host 2 (b1 of FIG. 5). On the other hand, when the received command type is a data-out command type (adtc), the local host 2 transmits the received command number and the argument to the portable device 3 first (b2, b3 of FIG. 5). When a response is returned from the portable device 3 (b4, b5 of FIG. 5), the local host 2 transmits the received data to the portable device 3 (b6, b7 of FIG. 5).

When transmission of the received data to the portable device 3 is finished, the local host 2 automatically issues a CMD 13, which is a stop command (b8, b9 of FIG. 5). The local host 2 checks by the CMD 13 that transmission of the data has been finished and there is no error (b10, b11 of FIG. 5), and transmits a response of the executed command to the remote host 1 (b12 of FIG. 5).

Figure 6:
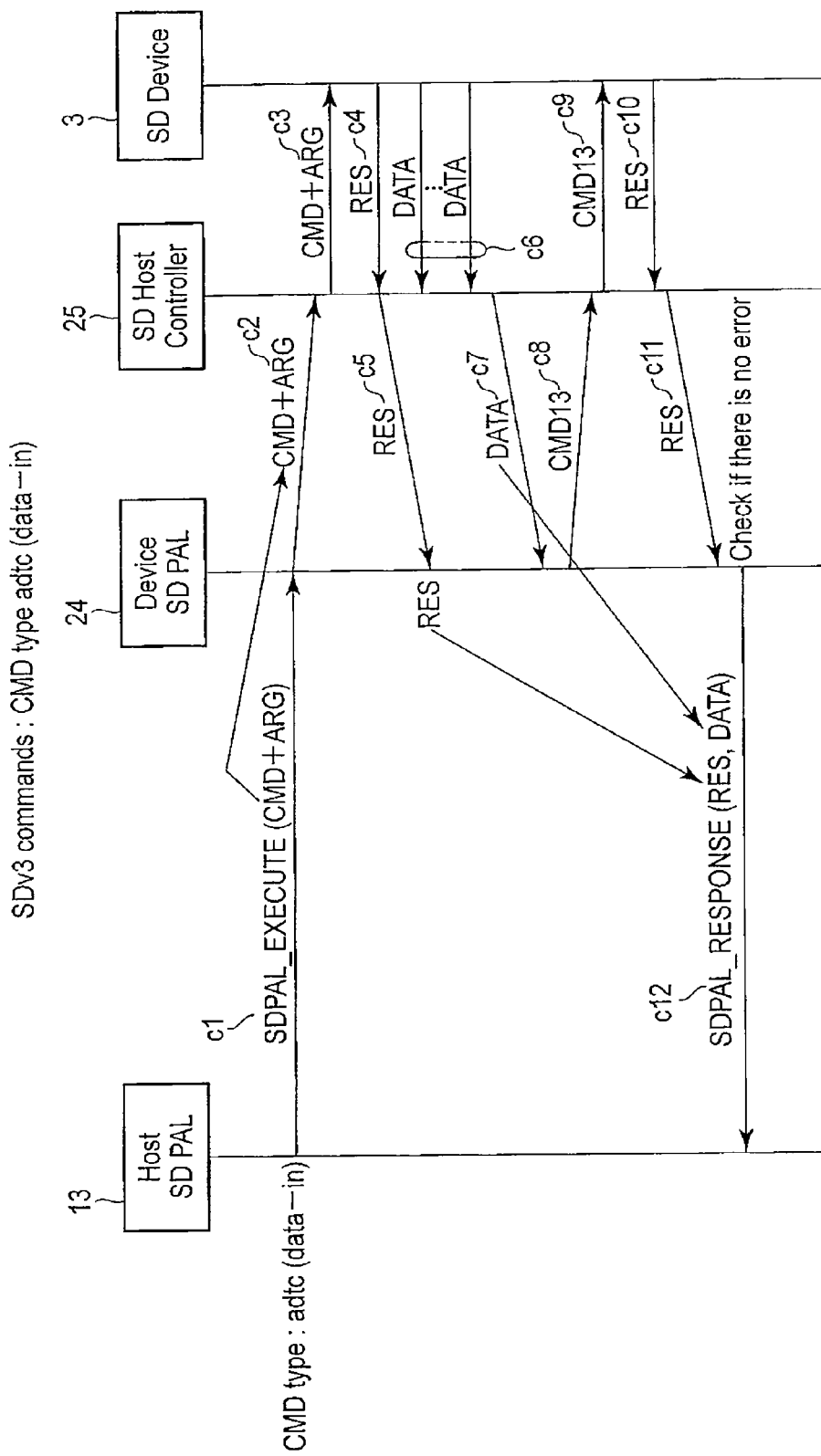
FIG. 6 is an exemplary diagram illustrating a data-in command execution sequence in the remote access system of the first embodiment.

FIG. 6 is an exemplary diagram illustrating a data-in command execution sequence.

In the case of a data-in command type (adtc), the remote host 1 transmits a command type, a command number, an argument, and a response type to the local host 2 (c1 of FIG. 6). On the other hand, when the received command type is a data-in command type (adtc), the local host 2 transmits the received command number and the argument to the portable device 3 first (c2, c3 of FIG. 6). In addition, the local host 2 receives a response which is returned from the portable device 3 (c4, c5 of FIG. 6). When the local host 2 finishes receiving the response from the portable device 3 (c6, c7 of FIG. 6), the local host 2 automatically issues a CMD 13, which is a stop command (c8, c9 of FIG. 6). The local host 2 checks by the CMD 13 that reception of the data has been finished and there is no error (c10, c11 of FIG. 6), and transmits a response of the executed command and the received data to the remote host 1 (c12 of FIG. 6).

As described above, according to the remote access system of the present embodiment, the command type and the response type are transmitted from the remote host 1 to the local host 2, simultaneously with the command (command number and argument). The local host 2 recognizes the command execution sequence, the response timing, and the size, based on the transmitted command type and the response type. Thereby, it is possible to reduce the volume of communication between the remote host 1 and the local host 2. In addition, even if the commands of the portable device 3 increase in the future, no additional mount is necessary when the commands correspond to one of the above systems (1) to (3).

Further, in the data-out commands, the command and the data are transmitted together from the remote host 1 to the local host 2, and thereby exchange of protocol information on a wireless section can be reduced, when the remote host 1 is connected to the local host 2 by wireless communication. In the same manner, also in the data-in commands, the response and the data are transmitted together from the local host 2 to the remote host 1, and thereby exchange of protocol information on a wireless section can be reduced.

Second Embodiment

Next, a second embodiment will be explained hereinafter.

It is sometimes necessary for a portable device 3 to execute a proper command before or after a specific command. A remote access system of the present embodiment further includes a mechanism of automatically executing the proper command between a local host 2 and the portable device 3, by setting a flag in a header of a remote command for transmitting the specific command from the remote host 2 to the local host 2, to omit transmission and reception of commands and responses in a half-duplex communication part being the former part in order to realize reduction in protocol overhead.

Figure 7:
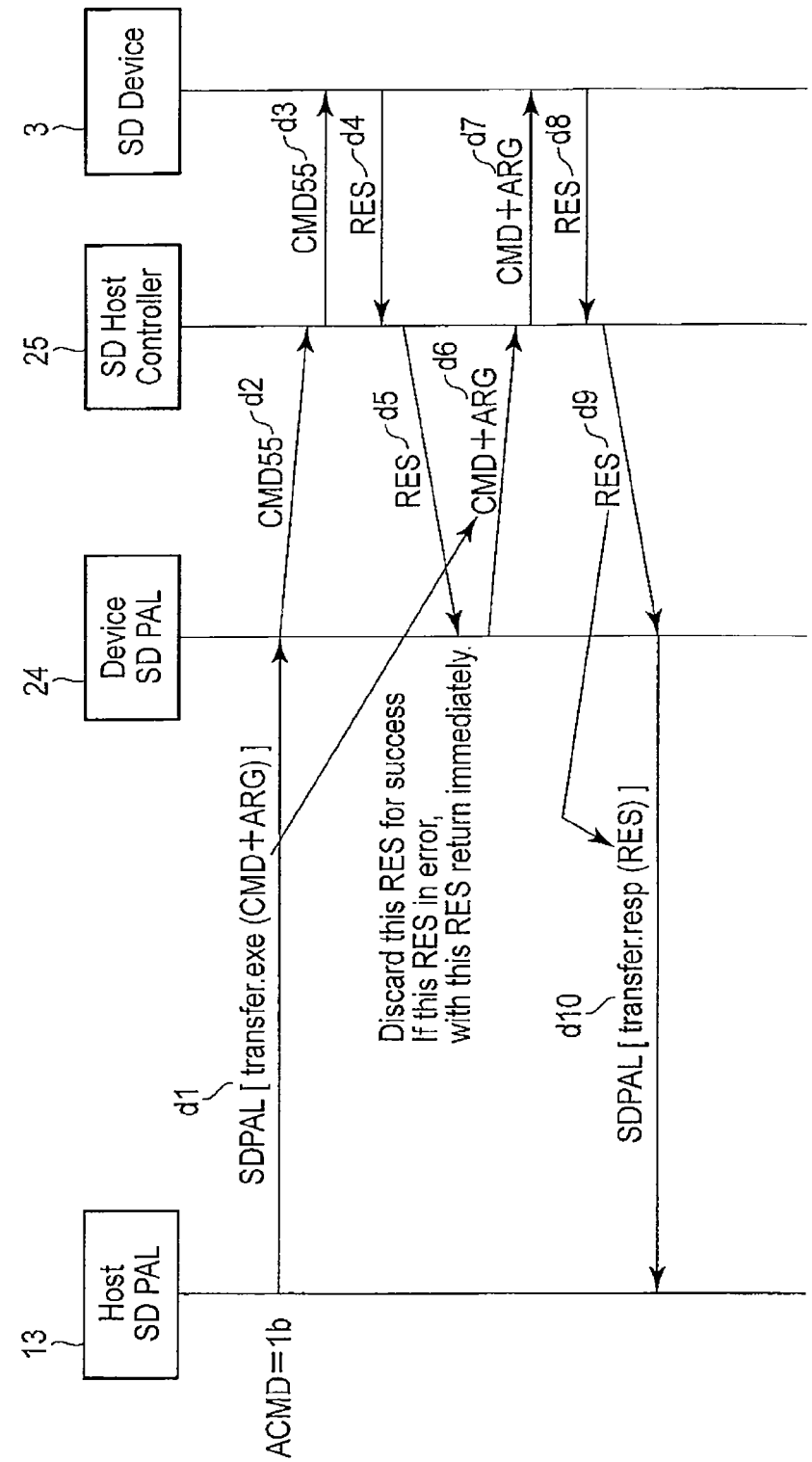
FIG. 7 is an exemplary diagram illustrating a command execution sequence performed when an ACMD flag is turned on in a remote access system of a second embodiment.

FIG. 7 is an exemplary diagram illustrating a command execution sequence in the case where an AMCD flag is turned on.

When an application (expansion) command is to be issued to the portable device 3, it is necessary to issue a CMD 55 before the application command. When an application command is transmitted to the local host 2, a remote host 1 sets the ACMD flag on (d1 of FIG. 7). When the ACMD flag is on, the local host 2 issues a CMD 55 to the portable device 3, before the designated command (d2, d3 of FIG. 7). When a response is returned from the portable device 3 (d4, d5 of FIG. 7), the local host 2 issues the transmitted command to the portable device 3 (d6, d7 of FIG. 7). The local host 2 transmits a response which is returned from the portable device 3 for the transmitted command to the remote host 1 (d8 to d10 of FIG. 7).

FIG. 8 is an exemplary diagram illustrating a command execution sequence in the case where a trans flag is turned on.

Commands of the portable device 3 include commands which are to be issued when the portable device 3 is in a "trans" state. When the portable device 3 is in a "stby" state when a command of this type is to be issued, it is necessary to issue a CMD 7 to change the portable device 3 from the "stby" state to the "trans" state, before the command. When a command of this type is transmitted to the local host 2, the remote host 1 sets a trans flag on (e1 of FIG. 8).

Since the local host 2 checks whether the portable device 3 is in the "stby" state or the "trans" state, when the trans flag is on and the portable device 3 is in the "stby" state, the local host 2 issues a CMD 7 and changes the portable device 3 to the "trans" state (e2, e3 of FIG. 8). When a response to the CMD 7 is returned from the portable device 3 (e4, e5 of FIG. 8), the local host 2 issues the transmitted command to the portable device 3 (e6, e7 of FIG. 8). As a matter of course, it is unnecessary to issue CMD 7 when the portable device 3 is in the "trans" state from the first. The local host 2 transmits a response which is returned from the portable device 3 to the transmitted command to the remote host 1 (e8 to e10 of FIG. 8).

Figure 9:
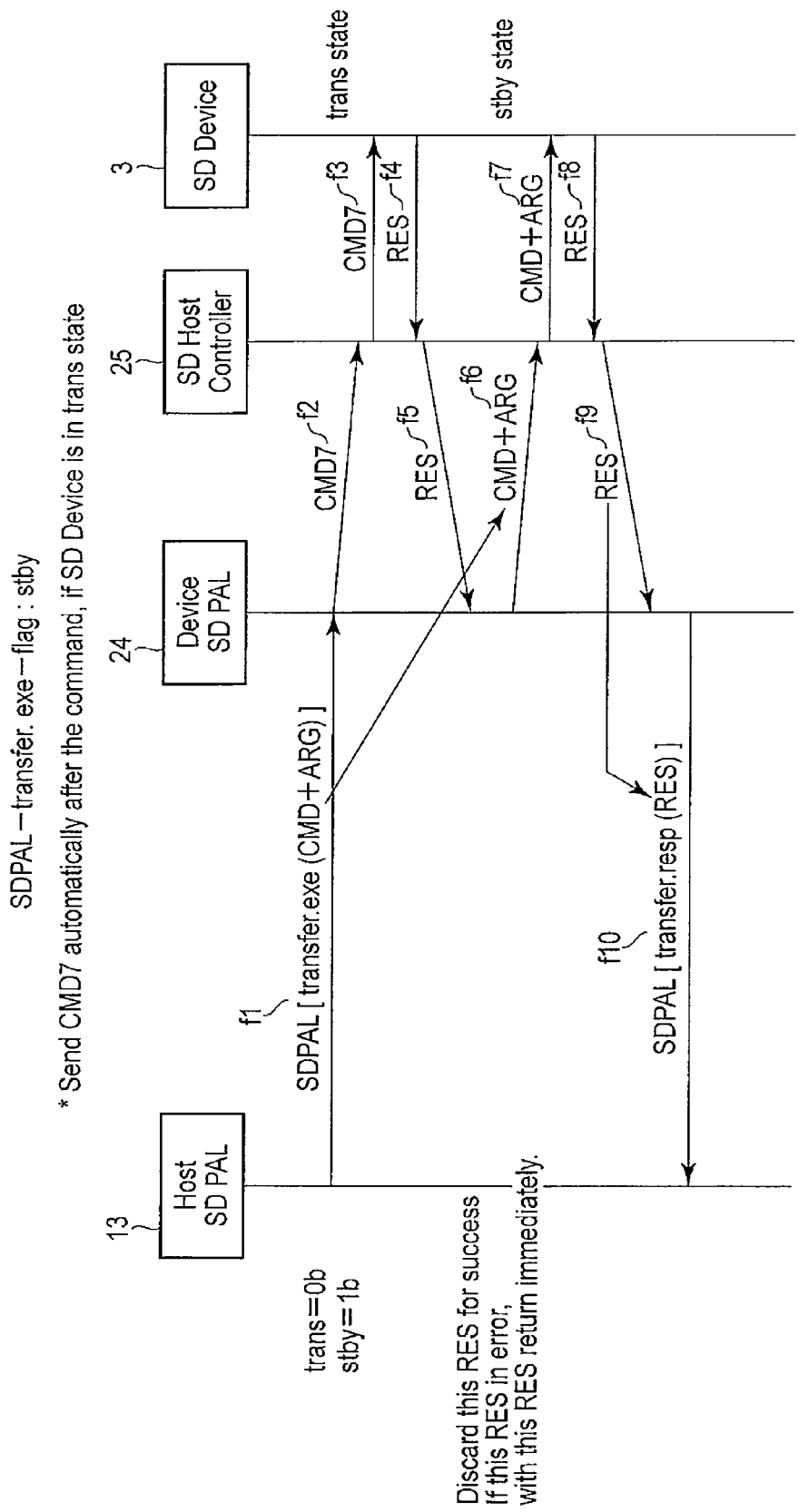
FIG. 9 is an exemplary diagram illustrating a command execution sequence performed when a stby flag is turned on in the remote access system of the second embodiment.

FIG. 9 is an exemplary diagram illustrating a command execution sequence in the case where a stby flag is turned on.

Commands of the portable device 3 include commands which are to be issued when the portable device 3 is in the "stby" state. When the portable device 3 is in the "trans" state when a command of this type is to be issued, it is necessary to issue a CMD 7 to change the portable device 3 from the "trans" state to the "stby" state, before the command. Specifically, the CMD 7 is a command to change the portable device 3 from the stby state to the trans state, and vice versa. When a command of this type is transmitted to the local host 2, the remote host 1 sets a stby flag on (f1 of FIG. 9).

Since the local host 2 checks whether the portable device 3 is in the "stby" state or the "trans" state, when the stby flag is on and the portable device 3 is in the "trans" state, the local host 2 issues a CMD 7 and changes the portable device 3 to the "stby" state (f2, f3 of FIG. 9). When a response to the CMD 7 is returned from the portable device 3 (f4, f5 of FIG. 9), the local host 2 issues the transmitted command to the portable device 3 (f6, f7 of FIG. 9). As a matter of course, it is unnecessary to issue CMD 7 when the portable device 3 is in the "stby" state from the first. The local host 2 transmits a response which is returned from the portable device 3 to the transmitted command to the remote host 1 (f8 to f10 of FIG. 9).

Figure 10:
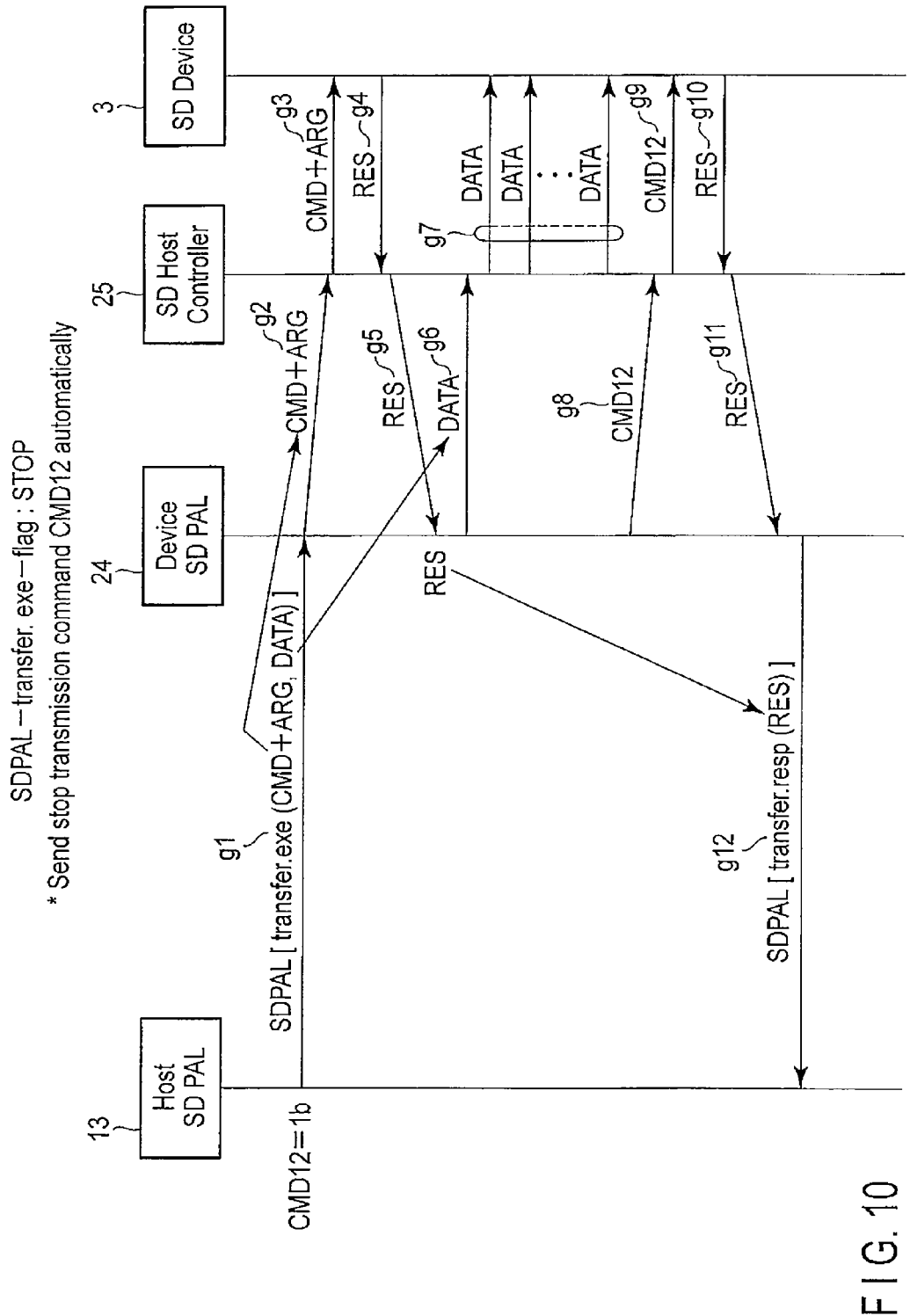
FIG. 10 is an exemplary diagram illustrating a command execution sequence performed when a STOP flag is turned on in the remote access system of the second embodiment.

FIG. 10 is an exemplary diagram illustrating a command execution sequence in the case where a STOP flag is turned on.

For example, when a plurality of blocks of data writing or reading are performed for the portable device 3, generally, a CMD 12 which is a transmission stop command is issued at the end. Therefore, for example, when a command to perform a plurality of blocks of data writing is transmitted to the local host 2, the remote host 1 sets a STOP flag on (g1 of FIG. 10).

As explained in the first embodiment, in the case of the data-out command type, the local host 2 transmits the received command number and the argument to the portable device 3 first (g2, g3 of FIG. 10). When a response is returned from the portable device 3 (g4, g5 of FIG. 10), the local host 2 transmits the received data to the portable device 3 (g6, g7 of FIG. 10). Then, when the STOP flag is in the on state, the local host 2 automatically issues CMD 12 which is a transmission stop command, when the local host 2 finishes transmitting the received data to the portable device 3 (g8, g9 of FIG. 10). When a response to the CMD 12 is returned from the portable device 3 (g10, g11 of FIG. 10), the local host 2 transmits a response to the executed command to the remote host 1 (g12 of FIG. 10).

Figure 11:
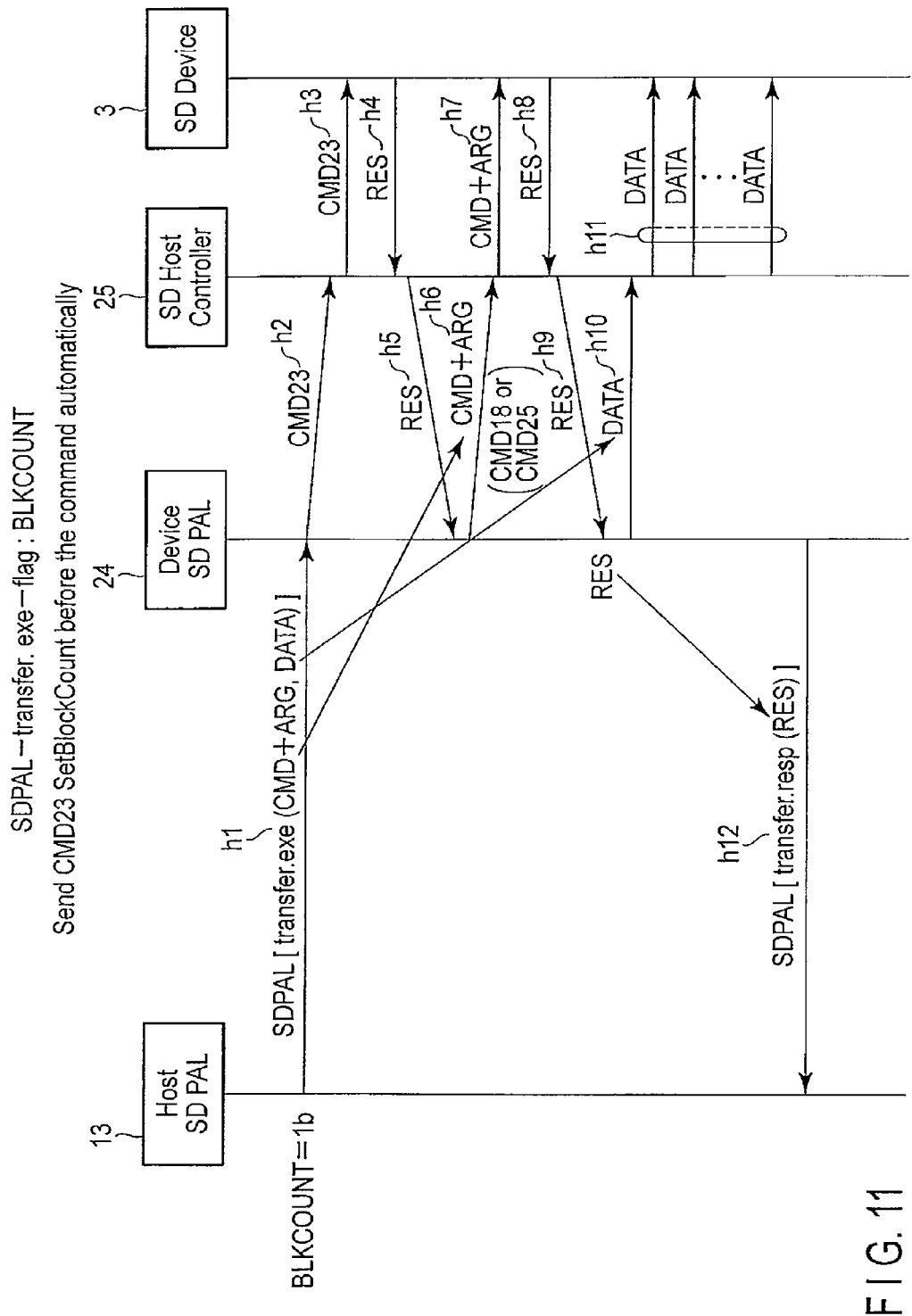
FIG. 11 is an exemplary diagram illustrating a command execution sequence performed when a BLKCOUNT flag is turned on in the remote access system of the second embodiment.

FIG. 11 is an exemplary diagram illustrating a command execution sequence in the case where a BLKCOUNT flag is turned on.

Among commands for the portable device 3, a CMD 18 or a CMD 25 is of the data-out command type, and is a command for notifying the portable device 3 of the data size in advance by a CMD 23. When the remote host 1 transmits these commands to the local host 2, the remote host 1 sets the BLKCOUNT flag on (h1 of FIG. 11).

When the BLKCOUNT flag is in the on state, the local host 2 issues a CMD 23 to notify the portable device 3 in advance of the data size of data transmitted from the remote host 1 (h2, h3 of FIG. 11). When a response to the CMD 23 is returned from the portable device 3 (h4, h5 of FIG. 11), the local host 2 issues the CMD 18 or the CMD 25, which is the transmitted command, to the portable device 3 (h6, h7 of FIG. 11). When a response is returned from the portable device 3 (h8, h9 of FIG. 11), the local host 2 transmits the received data to the portable device 3 (h10, h11 of FIG. 11). When the local host 2 finishes transmitting the received data to the portable device 3, the local host 2 transmits a response to the executed command to the remote host 1 (h12 of FIG. 11).

As described above, according to the remote access system of the present embodiment, communication between the remote host 1 and the local host 2 is omitted for a command (which includes no argument or can be estimated from an argument of the transmitted command) which is required before or after a specific command, by setting a flag in the header of a communication packet between the remote host 1 and the local host 2. Thereby, the remote access system realizes execution of the command automatically and at a proper time between the local host 2 and the portable device 3.

Third Embodiment

Next, a third embodiment will be explained hereinafter.

FIG. 12 is an exemplary block diagram illustrating a schematic configuration of a remote access system according to the third embodiment. As illustrated in FIG. 12, a host controller 25 of a local host 2 deals with two connection interfaces (an SD bus and a UHS-II bus).

In the SD bus, a command is packetized in a Command Token Format, and a response is packetized in a Response Token Format. On the other hand, in the UHS-II bus, both a command and a response are packetized in a UHS-II Packet Format. When the host controller 25 of the local host 2 only deals with one connection interface, it suffices that the data format in a remote section between the remote host 1 and the local host 2 is compliant with the data format of the connection interface.

In comparison with this, when the host controller 25 of the local host 2 deals with two connection interfaces, it is necessary to contrive any means with respect to the data format in the remote section between the remote host 1 and the local host 2. In such a situation, the remote access system of the present embodiment adopts one of the following four formats, as the data format in the remote section between the remote host 1 and the local host 2.

(a) The remote host 1 issues a remote command for transmitting a command type, a local command (command number and argument), a response type, and data to the local host 2 in an original format. The local host 2 packetizes the transmitted command in the data format of the connection interface in the host controller 25, according to whether the command is addressed to a portable device 3 connected through the SD bus or a portable device connected through the UHS-II bus.

(b) The remote host 1 issues a remote command for transmitting a command type, a command (command number and argument), a response type, and data to the local host 2 in the Command Token Format (of the SD bus). When the transmitted command is addressed to the portable device 3 connected through the SD bus, the local host 2 transmits the command to the portable device 3 by the host controller 25 without any processing. In this case, since a response in the Response Token Format is returned from the portable device 3, the local host 2 transmits the response, which is included in a response to the remote command, to the remote host 1 without any processing. On the other hand, when the transmitted command is addressed to the portable device 3 connected through the UHS-II bus, the local host 2 converts the command into packets in the UHS-II Packet Format by the host controller 25, and transmits the packets to the portable device 3. In this case, since a response in the UHS-II Packet Format is returned from the portable device 3, the local host 2 converts the response into the Response Token Format in the host controller 25, and transmits the response, which is included in a response to the remote command, to the remote host 1.

(c) The remote host 1 issues a remote command for transmitting a command type, a command (command number and argument), a response type, and data to the local host 2 in the UHS-II Packet Format (of the UHS-II bus). When the transmitted command is addressed to the portable device 3 connected through the UHS-II bus, the local host 2 transmits the command to the portable device 3 by the host controller 25 without any processing. In this case, since a response in the UHS-II Packet Format is returned from the portable device 3, the local host 2 transmits the response, which is included in a response to the remote command, to the remote host 1 without any processing. On the other hand, when the transmitted command is addressed to the portable device 3 connected through the SD bus, the local host 2 converts the command into packets in the Command Token Format by the host controller 25, and transmits the packets to the portable device 3. In this case, since a response in the Response Token Format is returned from the portable device 3, the local host 2 converts the response into the UHS-II Packet Format in the host controller 25, and transmits the response, which is included in a response to the remote command, to the remote host 1.

(d) The remote host 1 recognizes the bus of the portable device 3 connected to the local host 2, and transmits a remote command for transmitting a command type, a command (command number and argument), a response type, and data to the local host 2 in a proper packet format. The local host 2 only passes the transmitted command to the portable device 3, and passes a response returned from the portable device 3 to the remote host 1.

In the case of adopting any of the above (a) to (d), the local commands are classified into the three systems, and thereby the volume of communication between the remote host 1 and the local host 2 is reduced.

As described above, according to the remote access systems of the first to third embodiments, the remote access function of operating a storage device which is controlled by a first electronic apparatus from a second electronic apparatus by remote control through the first electronic apparatus can be realized as a mechanism with excellent convenience and expansion.

Although the portable devices of the first embodiment to third embodiment are stated as being SD cards (Registered Trademark), the portable devices include a memory card which has a memory function, an IO card which has a communication function, and a combo card which has both the memory function and the communication function, as the portable device including the first protocol. In addition, the portable device may not be portable, but may be a medium which is contained in the electronic apparatus and includes the first protocol.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A remote access system comprising:
a first electronic apparatus; and
a second electronic apparatus configured to remotely control a storage device controlled by the first electronic apparatus through the first electronic apparatus, wherein:
the second electronic apparatus comprises a remote command issuing module configured to issue a remote command of a second protocol to the first electronic apparatus for transmitting a local command of a first protocol to be issued to the storage device, the remote command comprising command type information indicating a type of the local command; and
the first electronic apparatus comprises a command processing module configured to issue one or more local commands comprising the local command transmitted from the second electronic apparatus by the remote command to the storage device, and to transmit a first response from the storage device to the second electronic apparatus by storing the first response into a second response to the remote command, in accordance with a process specified by the command type information in the remote command.

2. The system of claim 1, wherein:
the first protocol comprises a protocol to perform full-duplex communication; and
the second protocol comprises a protocol to perform half-duplex communication.

3. The system of claim 1, wherein:
the remote command issuing module is configured to store response type information indicating a type of response to the local command from the storage device into the remote command; and
the command processing module is configured to secure a storage region to store the first response from the storage device based on the response type information in the remote command.

4. The system of claim 3, wherein the command processing module is configured to recognize a timing of the first response from the storage device based on the response type information in the remote command.

5. The system of claim 1, wherein the remote command issuing module is configured to transmit data to be written in the storage device by the local command to the first electronic apparatus, by storing the data into the remote command.

6. The system of claim 1, wherein:
the remote command issuing module is configured to notify the first electronic apparatus that a second local command is to be issued to the storage device before or after issuance of a first local command transmitted by the remote command, by setting a flag defined in a header of a packet storing the remote command to an on state; and
the command processing module is configured to issue the second local command to the storage device before or after issuance of the first local command when the flag is set to the on state.

7. The system of claim 6, wherein the command processing module is configured to determine whether issuing the second local command is necessary or not when the flag is set to the on state, and to issue the second local command to the storage device when the command processing module determines issuing the second local command is necessary.

8. The system of claim 1, wherein:
the first electronic apparatus and the storage device are connected by one of a first interface and a second interface;
the remote command issuing module is configured to packetize the remote command for transmitting the local command in a format conforming to the first interface; and
the command processing module is configured to transmit a packet storing the local command in the remote command to the storage device without any processing when the first electronic apparatus is connected with the storage device by the first interface, and to transmit the packet to the storage device by converting the packet from the format conforming to the first interface to a format conforming to the second interface when the first electronic apparatus is connected with the storage device by the second interface.

9. The system of claim 1, wherein:
the first electronic apparatus and the storage device are connected by one of a first interface and a second interface;
the remote command issuing module is configured to recognize by which of the first interface and the second interface the first electronic apparatus is connected with the storage device, to packetize the remote command for transmitting the local command in a format conforming to the first interface when the first electronic apparatus is connected with the storage device by the first interface, and to packetize the remote command for transmitting the local command in a format conforming to the second interface when the first electronic apparatus is connected with the storage device by the second interface; and
the command processing module is configured to transmit a packet storing the local command in the remote command to the storage device without any processing.

10. An electronic apparatus comprising:
a remote command transmitting/receiving module configured to receive a remote command of a second protocol from another electronic apparatus, and to transmit a response to the remote command to the other electronic apparatus, the remote command being issued for transmitting a local command of a first protocol to be issued to a storage device, the remote command comprising command type information indicating a type of the local command; and
a command processing module configured to issue one or more local commands comprising the local command transmitted from the other electronic apparatus by the remote command to the storage device, and to transmit a first response from the storage device to the other electronic apparatus by storing the first response into a second response to the remote command, which is to be transmitted by the remote command transmitting/receiving module, in accordance with a process specified by the command type information in the remote command received by the remote command transmitting/receiving module from the other electronic apparatus.

11. The apparatus of claim 10, wherein:
the first protocol comprises a protocol to perform full-duplex communication; and
the second protocol comprises a protocol to perform half-duplex communication.

12. The apparatus of claim 10, wherein:
the remote command comprises response type information indicating a type of response to the local command from the storage device; and
the command processing module is configured to secure a storage region to store the first response from the storage device based on the response type information in the remote command.

13. The apparatus of claim 12, wherein the command processing module is configured to recognize a timing of the first response from the storage device based on the response type information in the remote command.

14. The apparatus of claim 10, wherein the command processing module is configured to issue a second local command to the storage device before or after issuance of a first local command when a flag defined in a header of a packet storing the remote command is set to an on state, the flag indicating that the second local command is to be issued to the storage device before or after issuance of the first local command transmitted by the remote command.

15. The apparatus of claim 14, wherein the command processing module is configured to determine whether issuing the second local command is necessary to or not when the flag is set to the on state, and to issue the second local command to the storage device when the command processing module determines issuing the second local command is necessary.

16. The apparatus of claim 10, wherein:
the apparatus is connected with the storage device by one of a first interface and a second interface;
the remote command for transmitting the local command is packetized in a format conforming to the first interface; and
the command processing module is configured to transmit a packet storing the local command in the remote command to the storage device without any processing when the apparatus is connected with the storage device by the first interface, and to transmit the packet to the storage device by converting the packet from the format conforming to the first interface to a format conforming to the second interface, when the apparatus is connected with the storage device by the second interface.

17. The apparatus of claim 10, wherein:
the apparatus is connected with the storage device by one of a first interface and a second interface;
the remote command for transmitting the local command is packetized in a format conforming to the first interface when the apparatus is connected with the storage device by the first interface, and is packetized in a format conforming to the second interface when the apparatus is connected with the storage device by the second interface; and the command processing module is configured to transmit a packet storing the local command in the remote command to the storage device without any processing.

18. A method of processing remote access for a remote access system in which a storage device controlled by a first electronic apparatus is remotely controlled from a second electronic apparatus through the first electronic apparatus, the method comprising:

issuing a remote command of a second protocol to the first electronic apparatus for transmitting a local command of a first protocol to be issued to the storage device, the remote command comprising command type information indicating a type of the local command, by the second electronic apparatus; and issuing one or more local commands comprising the local command transmitted from the second electronic apparatus by the remote command to the storage device, and transmitting a first response from the storage device to the second electronic apparatus by storing the first response into a second response to the remote command, in accordance with a process specified by the command type information in the remote command, by the first electronic apparatus.

19. The method of claim 18, further comprising:

storing response type information indicating a type of response to the local command from the storage device into the remote command, by the second electronic apparatus; and securing a storage region to store the first response from the storage device based on the response type information in the remote command, by the first electronic apparatus.

20. The method of claim 19, further comprising recognizing a timing of the first response from the storage device based on the response type information in the remote command, by the first electronic apparatus.

21. An electronic apparatus comprising:

a first bus corresponding to a first interface;

a second bus corresponding to a second interface;

a remote command transmitting/receiving processor to receive a remote command of a second protocol from another electronic apparatus, and to transmit a response to the remote command to the other electronic apparatus, the remote command being issued for transmitting a local command of a first protocol to be issued to a storage device, the remote command being packetized in a format conforming to the first interface, and the remote command comprising command type information indicative of a type of the local command; and a command processor to determine whether the local command transmitted from the other electronic apparatus by the remote command is any one of a no-data command, a data-out command, and a data-in command based on the command type information in the remote command received by the remote command transmitting/receiving processor from the other electronic apparatus, to issue one or more local commands comprising the local command transmitted from the other electronic apparatus by the remote command to the storage device, and to transmit a first response from the storage device to the other electronic apparatus by storing the first response into a second response to the remote command which is to be transmitted by the remote command transmitting/receiving processor to the other electronic apparatus, in accordance with a communication process between the electronic apparatus and the storage device and a communication process between the electronic apparatus and the other electronic apparatus specified by each of the no-data command, a data-out command, and a data-in command, wherein the command processor transmits a packet storing the local command in the remote command to the storage device without any processing when the storage device is connected via the first bus, and transmits the packet storing the local command in the remote command to the storage device by converting the packet from the format conforming to the first interface to a format conforming to the second interface when the storage device is connected via the second bus.

22. The apparatus of claim 21, wherein:

the first protocol comprises a protocol to perform full-duplex communication; and the second protocol comprises a protocol to perform half-duplex communication.

23. The apparatus of claim 21, wherein:

the remote command comprises response type information indicating a type of response to the local command from the storage device; and the command processor secures a storage region to store the first response from the storage device based on the response type information in the remote command.

24. The apparatus of claim 23, wherein the command processor recognizes a timing of the first response from the storage device based on the response type information in the remote command.

25. The apparatus of claim 21, wherein the command processor issues a second local command to the storage device before or after issuance of a first local command when a flag defined in a header of a packet storing the remote command is set to an on state, the flag indicating that the second local command is to be issued to the storage device before or after issuance of the first local command transmitted by the remote command.

26. The apparatus of claim 25, wherein the command processor determines whether issuing the second local command is necessary or not when the flag is set to the on state, and issues the second local command to the storage device when the command processor determines issuing the second local command is necessary.

27. An electronic apparatus comprising:

a first bus corresponding to a first interface;

a second bus corresponding to a second interface;

a remote command transmitting/receiving processor to receive a remote command of a second protocol from another electronic apparatus, and to transmit a response to the remote command to the other electronic apparatus, the remote command being issued for transmitting a local command of a first protocol to be issued to a storage device, the remote command being packetized in a format conforming to the first interface when the storage device is connected via the first bus, the remote command being packetized in a format conforming to the second interface when the storage device is connected via the second bus, and the remote command comprising command type information indicative of a type of the local command; and a command processor to determine whether the local command transmitted from the other electronic apparatus by the remote command is any one of a no-data command, a data-out command, and a data-in command based on the command type information in the remote command received by the remote command transmitting/receiving processor from the other electronic apparatus, to issue one or more local commands comprising the local command transmitted from the other electronic apparatus by the remote command to the storage device, and to transmit a first response from the storage device to the other electronic apparatus by storing the first response into a second response to the remote command which is to be transmitted by the remote command transmitting/receiving processor to the other electronic apparatus, in accordance with a communication process between the electronic apparatus and the storage device and a communication process between the electronic apparatus and the other electronic apparatus specified by each of the no-data command, a data-out command, and a data-in command, wherein the command processor transmits a packet storing the local command in the remote command to the storage device without any processing.

28. The apparatus of claim 27, wherein:
the first protocol comprises a protocol to perform full-duplex communication; and
the second protocol comprises a protocol to perform half-duplex communication.

29. The apparatus of claim 27, wherein:
the remote command comprises response type information indicating a type of response to the local command from the storage device; and
the command processor secures a storage region to store the first response from the storage device based on the response type information in the remote command.

30. The apparatus of claim 29, wherein the command processor recognizes timing of the first response from the storage device based on the response type information in the remote command.

31. The apparatus of claim 27, wherein the command processor issues a second local command to the storage device before or after issuance of a first local command when a flag defined in a header of a packet storing the remote command is set to an on state, the flag indicating that the second local command is to be issued to the storage device before or after issuance of the first local command transmitted by the remote command.

32. The apparatus of claim 31, wherein the command processor determines whether issuing the second local command is necessary or not when the flag is set to the on state, and issues the second local command to the storage device when the command processor determines issuing the second local command is necessary.

33. A method of processing remote access for an electronic apparatus comprising a first bus corresponding to a first interface and a second bus corresponding to a second interface, the method comprising:
receiving a remote command of a second protocol from another electronic apparatus, the remote command being issued for transmitting a local command of a first protocol to be issued to a storage device, the remote command being packetized in a format conforming to the first interface, and the remote command comprising command type information indicative of a type of the local command;
determining whether the local command transmitted from the other electronic apparatus by the remote command is any one of a no-data command, a data-out command, and a data-in command based on the command type information in the remote command, issuing one or more local commands comprising the local command transmitted from the other electronic apparatus by the remote command to the storage device, and transmitting a first response from the storage device to the other electronic apparatus by storing the first response into a second response to the remote command which is to be transmitted by the remote command transmitting/receiving processor to the other electronic device, in accordance with a communication process between the electronic apparatus and the storage device and a communication process between the electronic apparatus and the other electronic apparatus specified by each of the no-data command, a data-out command, and a data-in command, wherein the issuing the one or more local commands comprises transmitting a packet storing the local command in the remote command to the storage device without any processing when the storage device is connected via the first bus, and transmitting the packet storing the local command in the remote command to the storage device by converting the packet from the format conforming to the first interface to a format conforming to the second interface when the storage device is connected via the second bus.

34. A method of processing remote access for an electronic apparatus comprising a first bus corresponding to a first interface and a second bus corresponding to a second interface, the method comprising:
receiving a remote command of a second protocol from another electronic apparatus, the remote command being issued for transmitting a local command of a first protocol to be issued to a storage device, the remote command being packetized in a format conforming to the first interface when the storage device is connected via the first bus, the remote command being packetized in a format conforming to the second interface when the storage device is connected via the second bus, and the remote command comprising command type information indicative of a type of the local command; and
determining whether the local command transmitted from the other electronic apparatus by the remote command is any one of a no-data command, a data-out command, and a data-in command based on the command type information in the remote command, issuing one or more local commands comprising the local command transmitted from the other electronic apparatus by the remote command to the storage device, and transmitting a first response from the storage device to the other electronic apparatus by storing the first response into a second response to the remote command which is to be transmitted by the remote command transmitting/receiving apparatus to the other electronic apparatus, in accordance with a communication process between the electronic apparatus and the storage device and a communication process between the electronic apparatus and the other electronic apparatus specified by each of the no-data command, a data-out command, and the data-in command, wherein the issuing the one or more local commands comprises transmitting a packet storing the local command in the remote command to the storage device without any processing.

* * * * *